Figure 1:
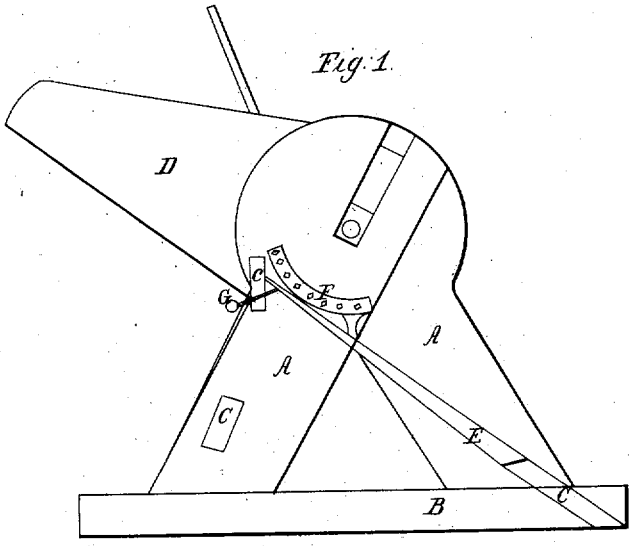
Figure 2:
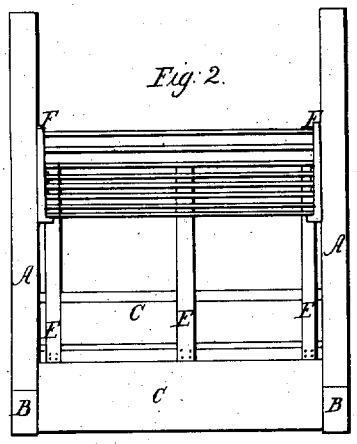
Figure 1:
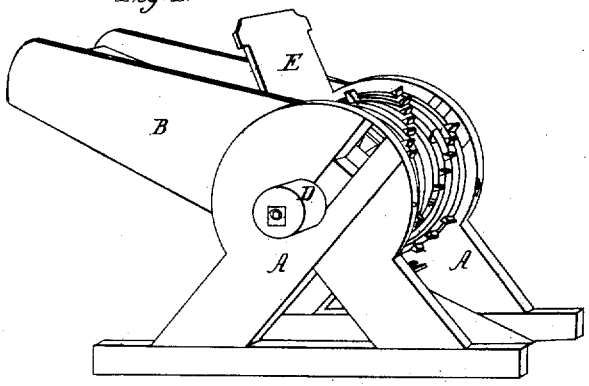
Figure 2:
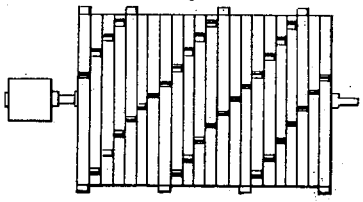
Figure 2:
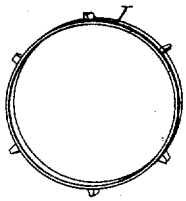
Figure 2:
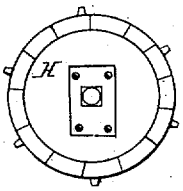
Figure 3:
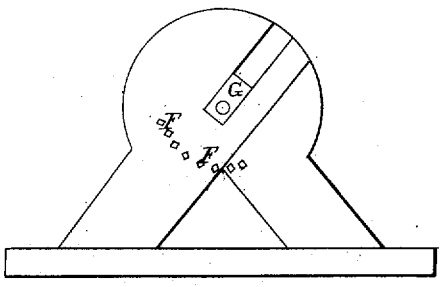

2 Sheets—Sheet 1.

6525X

E. WARREN.

THRESHING MACHINE.

Patented Apr. 28, 1831.

Witnesses;

Owen G. Warren

L. F. Warren

Inventor;

Edmund Warren

6525X

E. WARREN.

THRESHING MACHINE.

Patented Apr. 28, 1831.

Witnesses;
Owen F. Warren
[illegible]

Inventor;
Edmund Warren

THE NORRIS PETERS CO., PHOTO-LITHO., WASHINGTON, D. C.

Apl. 28. 1831

6525X

Edmund Warren.

Letters Patent.

The schedule referred to in these Letters Patent and making part of the same containing a description in the words of the said Edmund Warren himself of his Improvement in the Thrashing Machine.

A Machine for thrashing all kinds of small Grain and seed, and also Indian Corn. This machine is constructed first by framing two pieces of timber bevelling, for each side, with bed pieces connecting them at the bottom; each piece of the side being set as a brace to the other, cross bars confine the sides together. Secondly by placing a concave about fourteen inches from the top, framed of about twelve square rods set with one edge up. Thirdly of a cylinder about fourteen inches in diameter, the surface of which is formed by wrought iron bands, or hoops which cover it from one end to the other, with spurs or cogs of equal number on all projecting about three fourths of an inch, and being about one fourth of an inch thick, and more or less in width, as best suits the worker. These hoops when placed from a spiral surface of spurs. This cylinder is suspended over the concave in boxes capable of rising to permit any hard substance which may pass with the grain to escape, and the weight of the cylinder forces the sliding boxes down to their place. A hopper is placed at one side of the cylinder and hinged to the frame. having a sliding guard board which is drawn up for grain and slid down to the floor of the box for corn. The cylinder is raised for indian corn by placing blocks under the boxes of about one inch and one quarter thick. Section second of the concave. The concave being framed independent, of a form to suit the diameter of the cylinder, and encompassing about one fourth of its circle, this is placed upon three pieces of timber about two inches square at one end. these pieces being about three feet and one half long, are made fast at the lower cross bar in front of the cylinder, and pass across the upper, which is about one foot above it, on an angle of forty five in [illegible]

6525x Apl 28, 1831 degrees. which places the concave under the cylinder, and it is rais-
ed or lowered by screws at the second cross bar. In this section the
cylinder may be made fast without sliding boxes. The cylinder
is put in motion by a band attached to a whirl. on one end of the
cylinder and driven by any power sufficient; the length of the
cylinder for two horse power is about two feet. for one Horse
power eighteen inches is sufficient. I claim in this, the wrought
iron hooped cylinder with spurs, the particular form of the frame
to give great strength with little expense, or workmanship, as
also the inclined springs for the concave, with the mode of chang-
ing them by screws for corn.

Edward Warren

Exd. W.J.C.
Witnesses
Henry Bangs
Saml. Clark.

(539 Words)

(Patented april 28. 1831)